(12) United States Patent
Bedogni

(10) Patent No.: US 12,541,033 B2
(45) Date of Patent: Feb. 3, 2026

(54) PERSONAL WEARABLE DOSIMETER FOR NEUTRONS

(71) Applicant: ISTITUTO NAZIONALE DI FISICA NUCLEARE, Frascati (IT)

(72) Inventor: Roberto Bedogni, Frascati (IT)

(73) Assignee: ISTITUTO NAZIONALE DI FISICA NUCLEARE, Frascati (IT)

( * ) Notice: Subject to any disclaimer, the term of this patent is extended or adjusted under 35 U.S.C. 154(b) by 439 days.

(21) Appl. No.: 17/619,209

(22) PCT Filed: Jun. 19, 2020

(86) PCT No.: PCT/IB2020/055807
§ 371 (c)(1),
(2) Date: Dec. 14, 2021

(87) PCT Pub. No.: WO2020/255080
PCT Pub. Date: Dec. 24, 2020

(65) Prior Publication Data
US 2022/0244409 A1    Aug. 4, 2022

(30) Foreign Application Priority Data
Jun. 21, 2019   (IT) ............... 102019000009741

(51) Int. Cl.
*G01T 1/02*   (2006.01)
*G01T 3/00*   (2006.01)

(52) U.S. Cl.
CPC . *G01T 1/02* (2013.01); *G01T 3/00* (2013.01)

(58) Field of Classification Search
CPC ................... G01T 1/02; G01T 3/00
See application file for complete search history.

(56) References Cited

U.S. PATENT DOCUMENTS

| 3,699,337 | A | * | 10/1972 | Hoy | ............... G01T 3/00 |
| | | | | | 250/390.03 |
| 3,911,283 | A | | 10/1975 | Williams | |
| 3,932,758 | A | | 1/1976 | Burgkhart et al. | |
| 4,492,872 | A | | 1/1985 | Burgkhart et al. | |
| 5,340,985 | A | * | 8/1994 | Liu | ............... G01T 1/11 |
| | | | | | 250/484.3 |

(Continued)

FOREIGN PATENT DOCUMENTS

| CN | 102 043 160 A | 5/2011 | |
| JP | H05 281364 A | 10/1993 | |
| JP | 2006329793 A | * 12/2006 | ............... G01T 1/02 |

OTHER PUBLICATIONS

Lars-Erik Holm: "ICRP Publication 103—The 2007 Recommendations of the International Commission on Radiological Protection", Annals of the ICRP, Jan. 1, 2007, pp. 1-339, vol. 37, No. 2-4.

*Primary Examiner* — David J Makiya
*Assistant Examiner* — Gisselle M Gutierrez
(74) *Attorney, Agent, or Firm* — Gregory P. Einhorn; Greer, Burns & Crain, Ltd.

(57) ABSTRACT

The invention relates to a dosimeter (A) wearable by a human subject which includes:
   at least a first slow neutron sensor S1;
   a matrix containing a certain amount of absorbent material for slow neutrons;
   at least a second slow neutron sensor S2;
   a moderator consisting of or comprising polyethylene, hydrogenated plastic, water, paraffin or other hydrogenated or deuterated compounds.

16 Claims, 1 Drawing Sheet

(56) References Cited

U.S. PATENT DOCUMENTS

| | | | | |
|---|---|---|---|---|
| 11,474,048 B2* | 10/2022 | Zreda | ................ | G01T 7/005 |
| 2004/0188677 A1* | 9/2004 | Luszik-Bhadra | ......... | G01T 1/24 |
| | | | | 257/48 |
| 2006/0138345 A1* | 6/2006 | Fehrenbacher | ........... | G01T 3/00 |
| | | | | 250/482.1 |
| 2010/0025594 A1* | 2/2010 | Nukatsuka | ................ | G01T 3/00 |
| | | | | 250/390.1 |
| 2018/0299569 A1* | 10/2018 | Inglis | ................ | G01T 3/00 |

* cited by examiner

PERSONAL WEARABLE DOSIMETER FOR NEUTRONS

This application is a national phase application claiming benefit of priority under 35 U.S.C. § 371 to Patent Convention Treaty (PCT) International Application serial number PCT/IB2020/055807, filed Jun. 19, 2020, now pending, which claims the benefit of priority to Italian patent No. 102019000009741 filed on Jun. 21, 2019. The aforementioned applications are expressly incorporated herein by reference in their entirety and for all purposes.

TECHNICAL FIELD OF THE INVENTION

The present invention relates to a wearable dosimeter for neutrons, electronically operated, capable of measuring the neutron dose received by a subject exposed to neutron radiation with energies ranging from the slow domain (less than 0.5 eV) to 20 MeV. This neutron dose is generically indicated with the letter H and is defined later.

PRIOR ART

For the purpose of health protection of workers operating in environments where neutron fields are present (nuclear, civil, oil, hospitals, particle accelerators), measuring devices called "personal neutron dosimeters" are used to be worn on the body. Said neutrons are differently susceptible to produce biological damage, according to their energy. Neutrons are considered "slow" when their energy E varies from zero to 0.5 eV, epithermal from 0.5 eV up to about 10 keV, fast from 10 keV to 20 MeV, high energy above 20 MeV. The different susceptibility of neutrons, depending on the energy, to produce biological damage in humans, is quantified by the radiation weighting factors, wR, defined by the ICRP (International Commission on Radiological Protection) and is maximum at 1 MeV (See ICRP publication 103). The magnitude that said personal neutron dosimeters should measure is $H_p(10)$, equivalent of personal dose at 10 mm of depth under a specific point of the human body, as defined by the international commissions ICRP (International Commission on Radiological Protection) and ICRU (International Commission on Radiation Units and Measurements). See in particular the ICRU report 51. Over the years these international commissions have changed the definition of the most appropriate size for the individual monitoring of exposed workers. The one currently recommended, indicated with the symbol $H_p(d)$, is the personal dose equivalent, defined as the "dose equivalent" (in itself defined by ICRU/ICRP) at a depth d below a specific point on the human body. For neutrons the recommended depth is 10 mm, so the size assumes the symbol $H_p(10)$.

Said $H_p(10)$, which is measured in sievert (Sv), has been defined, for the different types of radiation including neutrons, in order to allow the estimation of the radiological risk of individuals exposed to radiation fields. The measurement of $H_p(10)$ in neutron fields, by means of a measuring device to be worn on the body, presents considerable difficulties since:

neutrons, due to their transport properties in materials, are always present in said work environments with energies that vary from the domain of "slow neutrons" (energy less than 0.5 eV) up to several MeV, or tens-hundreds of MeV, depending on the monitored system; therefore neutrons are present with all the energies included in an interval of at least 10 orders of magnitude.

there is no single sensor that correctly responds in said range of at least 10 orders of magnitude in energy.

the curve (see ICRP 74) which describes the conversion coefficient from neutron fluence (defined in ICRU85a) to $H_p(10)$ varies, with varying energy, from the slow domain to 20 MeV, by a factor of 50 or more. Therefore, even if there was a sensor capable of detecting neutrons in all the various energies, it would have to be able to "weigh" them differently, through this conversion factor, according to their energy. Ideally it would be necessary not a "presence" sensor, but a "spectrometer", i.e. a system capable of determining both the number of neutrons and their energy.

All this is practically impossible to obtain with a single light device and of limited size, such that it can be worn by operators exposed to radiation.

The technical-scientific literature shows that over the decades different types of personal neutron dosimeters have been developed, most of which are of the "passive" type, i.e. the sensitive element(s) (the sensor (s) provides dosimetric information only after the execution of a deferred chemical or physical process (for example, in the case of a thermoluminescent crystal, heating). These personal dosimeters are not able to record the dosimetric information over time nor to provide it in real time, but only to integrate it over time. The reading of these passive dosimeters typically takes place every 1-3 months at a dosimetry service, which provides the result of the accumulated dose in the reading period. They are therefore unsuitable for indicating dangerous situations in real time or for determining how quickly the dose has accumulated over time. These latter functions are instead typical of personal electronic dosimeters (also called active, or "direct reading").

There are very few personal electronic neutron dosimeters on the market. Their measurement performance is limited by the fact that their response is highly variable as the energy of the neutrons varies. By response we mean the relationship between the measured value and the true value. A response of 10 means that the dosimeter is overestimating a factor 10. In an operating situation in which the energy distribution of the neutron field is unknown, these dosimeters may overestimate or underestimate the value of $H_p(10)$ of a factor 20 or more. This does not fall within the acceptability criteria, referred to the energy dependence, required by the IEC (International Electrotechnical Commission).

In U.S. Pat. No. 4,588,898 a device is described in the form of a sphere (from 16 to 30 cm in diameter). It exploits the albedo principle, that is, the revelation of those neutrons which, slowed down by the human body to the slow energies and retro-diffused towards the sensor, are measured as slow neutrons. This spherical device is impossible to wear due to its weight and size, and can only function as an environmental monitor.

U.S. Pat. No. 4,100,414 describes a passive deferred reading dosimeter which can be analyzed only after a chemical development (nuclear trace detector) or a heat treatment (thermoluminescent detectors). This feature excludes that real-time information can be obtained from these sensors. The device also measures neutrons with energy greater than 1 MeV with thin thicknesses of thorium, nuclear and radioactive material that today would be unthinkable to introduce into a device for workers' use.

U.S. Pat. No. 3,699,337 is also a passive dosimeter with deferred reading based on said thermoluminescent detectors.

US2004188677A1 describes a personal electronic dosimeter suitable for the measurement of photons superimposed on a neutron field, therefore it does not have as objective the measurement of the neutron dose.

Considering the known art, it can be said that at present there is no personal electronic neutron dosimeter capable of correctly providing the neutron dose received by a subject from the domain of slow neutrons at 20 MeV, which is able to obtain and record in real time the dosimetric information, and that it is wearable.

SUMMARY OF THE INVENTION

The aim of the present invention is to develop a dosimeter which solves the problems of the known art.

The dosimeter of the invention as claimed in claim 1 is small in size, wearable, obtains and records dosimetric information in real time as it works electronically, and is able to measure the neutron dose received by a subject exposed to neutrons with energies that vary from the slow domain (less than 0.5 eV) to 20 MeV. This neutron dose is generically indicated with the letter H. In particular, the dosimeter allows to measure the size $H_p(10)$ as the energy varies, as required by the standards of good technique, in the range that goes from the domain of slow neutrons to 20 MeV.

Further characteristics, objects and advantages will become clear from the detailed description of the invention, also in combination with the attached figures.

BRIEF DESCRIPTION OF THE FIGURES

The present invention will now be described in greater detail according to a preferred but not limiting embodiment and with reference to the attached illustrations, in which.

DETAILED DESCRIPTION OF THE INVENTION

The method and the wearable device according to the invention exploit:
- the characteristic of polyethylene and other hydrogenated or deuterated materials, as well as of the human body, to moderate neutrons throughout the energy range of interest;
- The presence of a moderator that includes compounds capable of absorbing slow neutrons;
- A combination of two or more slow neutron sensors which, in different positions with respect to the human body, inside the moderator, allow to obtain an energetic indication on the neutron field to be measured. This is described more in detail below.

Figure 1:
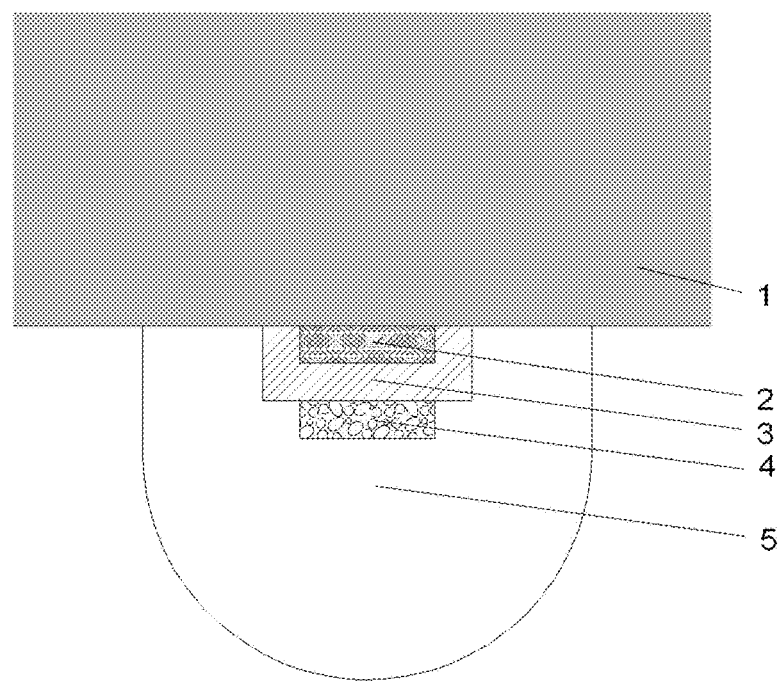
FIG. 1 is a schematic sectional representation of the wearable dosimeter.

With particular reference to FIG. 1, in which an exemplary and non-limiting embodiment is described, the wearable dosimeter (A) of the invention is associated with a human body (1) and comprises:
- at least a first slow neutron sensor (2) (S1);
- a matrix (3) containing a certain amount of absorbent or absorber material (terms considered synonyms within this description) for slow neutrons;
- at least a second slow neutron sensor (4) (S2);
- a moderator (5) consisting of or comprising polyethylene, hydrogenated plastic, water, paraffin or other hydrogenated or deuterated compounds. In the case of liquid material, the dosimeter will be shaped in the form of a plastic container.

The various elements that make up the proposed personal wearable dosimeter (A) are described below.

The at least one first slow neutron sensor (2) (S1) and the at least one second slow neutron sensor (2) (S1) will hereinafter also be referred to as the at least two neutron sensors (S1 and S2).

The operating principle of the device is based on the fact that the at least two slow neutron sensors (S1 and S2) placed inside the moderator 5 in different positions with respect to the human body, exposed to a spatial distribution of slow neutrons inside the moderator, allow to obtain an indication of the dose of neutrons received by the human body.

The dosimeter in fact is based on the fact that the neutron field present in the environment is modified and moderated by the human body 1 and by the moderator 5, producing a distribution of slow neutrons within said human body 1 and moderator 5. Said distribution of slow neutrons is not uniform, which is why it produces different signals in the at least two sensors, S1 and S2.

Before the device can be used to measure the value of the received neutron dose H, in particular the value of $H_p(10)$ in operating conditions of unknown fields, you it must first be calibrated at a center equipped with monoenergetic reference neutron fields such as those indicated by the ISO Standards of the Series 8529. The calibration involves the exposure of the dosimeter to fields of different energy, and to different angles of incidence, at known values of H. During these calibration exposures, the dosimeter must be mounted on a plastic puppet simulating the human body (see ISO Standards of Series 8529).

Figure 2:
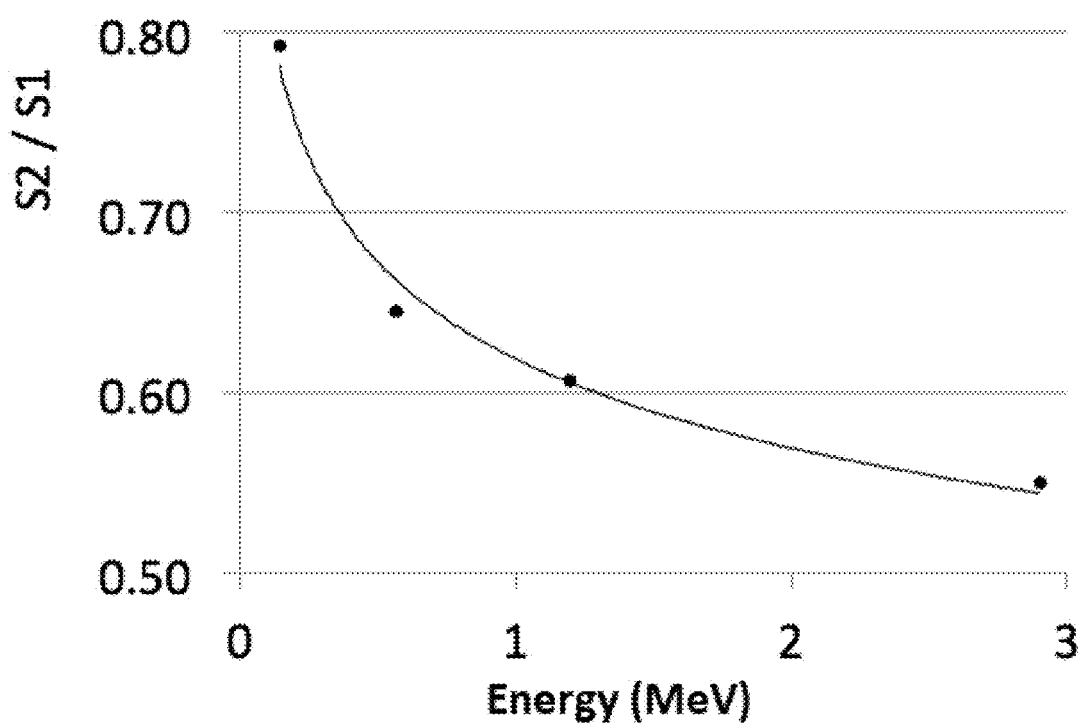
FIG. 2 shows an example of an energy recognition curve, or rather the trend of the ratio between the readings of the sensors S1 and S2 as the energy of the neutrons changes (obtained in mono-energy fields).

Once calibrated, the device can be used to measure the neutron dose H in operating conditions of unknown fields, according to the following method:
- Wear the device on the human body at the height of the trunk.
- Acquire, for a predetermined time interval, the signal of at least one first and at least one second sensor (S1 and S2).
- Estimate the "equivalent" energy of the neutron field through an energy recognition curve defined as the S2/S1 ratio, a monotonous function of Energy (FIG. 2). In the example of two sensors S1 and S2: if the energy recognition curve was that of FIG. 2; if during an operational measurement an S2/S1 ratio of 0.6 was measured, it could be said that the neutron field has an equivalent energy of about 1.2 MeV. In the event that there are more than two sensors, the energy recognition curve will be a mathematical combination of the signals from the various sensors, a monotonous function of Energy.
- Calculate, through previously determined calibration curves, one for each sensor, the calibration coefficient to be applied to the signals of the at least two sensors, S1 and S2. Said calibration coefficient is $K_n(E)$, where the subscript n indicates the sensor number, and (E) indicates that it depends on the energy of the neutrons. Said calibration coefficient $K_n(E)$ is defined as the ratio between the value of H and the corresponding signal of the nth sensor $K_n(E)$, previously determined by calibration, as mentioned above, with neutron fields of reference to standards ISO 8529.

- Determine the neutron dose H received by the exposed subject for each of the at least two sensors, multiplying the reading value of each sensor by the corresponding calibration coefficient.
- Calculate the average of the different values of H, obtained from the at least two sensors S1 and S2, to reduce the uncertainty of the measurement. This average value will constitute the output of the dosimeter, i.e. the neutron dose received by the subject in the measurement time interval. In particular, it will be possible to calculate $H_p(10)$, the equivalent of personal dose at a depth of 10 mm under a specific point of the human body. The procedure described above can be implemented by means of an electronic processing unit included or associated with the device.

It is therefore clear that, for the purposes of the present invention, for neutron sensors we mean electrical sensors. The electric sensors give real time information on the radiation field, and therefore allow to promptly implement the remedial or radio-protectionist actions that are required if the neutron fields are too intense to allow the presence of an individual.

These electric sensors are opposed to the so-called passive sensors with deferred reading, which instead provide integrated information on time with a periodicity of for example one month and which do not allow the timely implementation of said remedial or radio-protection actions.

Electrical sensors are generally larger than passive sensors and include electrical elements that must be taken into account in the design of the dosimeter. The solution of the present invention takes into account the typical dimensions of the neutron electric sensors and allows to realize a dosimeter compact enough to be worn by an individual.

Slow Neutron Sensors

The generic term of slow neutron sensor (S) refers to the complex comprising the material sensitive to the passage of neutrons and the device capable of producing an electrical signal correlated with the energy released by the slow neutron capture reaction, said assembly being such as to generate a recordable electrical signal. A combination of slow neutron sensors can advantageously consist of a minimum of two sensors (first sensor S1 and second sensor S2), located inside the moderator 5 in different positions with respect to the human body, however the sensors can also be more than two such as five, distributed inside the moderator 5. Furthermore, the various sensors can be the same or different from each other. Certainly with a number of sensors greater than two the dosimeter will be more precise, but also the production costs will be greater.

In any case, the at least one first sensor S1 will always be spaced from the at least one second sensor S2 and will be placed in the position closest to the human body while the sensor S2 and any additional sensors will be distributed within the moderator 5. The sensors they will not necessarily all be the same.

As mentioned above, a device (not shown in FIG. 1) is associated with the slow neutron sensitive element of each slow neutron sensor capable of producing an electrical signal correlated with the energy released by the slow neutron capture reaction in the sensor itself. Generally said sensors include elements "sensitive to slow neutrons": 10-Boron, 6-Lithium, 3-Helium, Gadolinium and Cadmium, or any isotope which has a high cross section for the nuclear capture of slow neutrons.

This cross section is defined in the ICRU85a report. It depends on the isotope and neutron energy. The devices associated with the sensors can be, for example, a semiconductive electric device such as diode, transistor, photodiode, phototransistor) or a capacitive type device such as a capacitor. Each device will produce an electrical signal (examples: a voltage, a current, an accumulated charge). Said signal will be proportional to the number of slow neutrons that interacted in the sensor. A very common example is a device that produces a voltage pulse for each slow neutron captured in the sensor. In this example the efficiency of the sensor is defined as the number of pulses produced divided by the number of slow neutrons that have hit the sensor.

Below is a non-exhaustive list of possible slow neutron sensors and associated devices, which can be used in the dosimeter described above:

- crystals, glass or scintillating fibers containing 6-Lithium, 10-Boron, 3-Helium, Gadolinium, Cadmium or any isotope that has a high cross section for the nuclear capture of slow neutrons.
- For these crystals, glasses or glittering fibers, the signal conversion element is a solid-state (in itself known) dynode multiplier or any electrical device capable of transforming the light emitted by said crystals, glasses or scintillating fibers into an electrical signal. Such crystals, glasses or glittering fibers are commercially available in different shapes and geometries. A preferred choice, due to its high sensitivity and its small size, is a scintillating crystal of 6-Lithium iodide activated with Europio (6-LiI (Eu)) of volume from about 0.05 $cm^3$ to about 0.15 $cm^3$.
- Diodes, transistors, photo-diodes, semiconductor phototransistors covered by 6-Lithium, 3-Helium, 10-Boron, Gadolinium, Cadmium or any isotope that has a high cross section for the nuclear capture of slow neutrons.
- Gas meters (known in themselves) as ionization chambers, proportional or discharge meters (Geiger-Muller) containing 6-Lithium, 10-Boron, 3-Helium, Gadolinium, Cadmium or any isotope that has a high "cross section for nuclear capture of slow neutrons".

Matrix Containing the Absorbing Material of Slow Neutrons

In order to differentiate the quantities of slow neutrons that reach the different sensors inside the dosimeter, it is advisable to place a layer between the sensors (for example the two sensors S1 and S2) inside the moderator 5 of absorbent material for slow neutrons. The absorbent material interposed (which in FIG. 1 is indicated as matrix 3) will be shaped in such a way as to shield the sensor placed near the human body so that it only detects albedo neutrons, that is those attenuated and retro-diffused by the human body.

Matrix 3 comprises or consists of any material containing 6-Lithium, 10-Boron, 3-Helium, Gadolinium, Cadmium or any isotope which has a high cross section for the nuclear capture of slow neutrons. However, a matrix comprising a lithium fluoride-based material is preferable since it does not emit gamma rays following the absorption of slow neutrons. Such gamma rays could in fact interfere with slow neutron sensors. Such materials with a high cross section for the nuclear capture of slow neutrons could be pure or dispersed within a matrix made of materials such as plastic, rubber, ceramic, resin, glue, metals. The thickness of the slow neutron absorber will be calculated based on the value of the cross section of the isotope(s) it contains. The person skilled in the art can easily calculate it [1], taking into account that an attenuation factor of at least 50 is preferable for neutrons with energy 0.025 eV.

Said matrix 3 based on absorber material for slow neutrons can be shaped or formed as a whole, as shown in FIG. 1, and placed close to the first sensor S1.

However, it could be divided into different parts located in different points of the moderator 5. As an example, a first portion close to the sensor S1 could be had, as in FIG. 1, associated with a second, thin portion, to externally cover the moderator 5 (towards the outside of the human body 1). In another embodiment there could be a single matrix 3 in the form of a thin absorbent element, placed inside the moderator 5, at an intermediate distance between the sensors and the external surface of the moderator 5.

Moderator

The moderator 5 can be constituted or include any highly hydrogenated or deuterated material, such as polyethylene, polypropylene, paraffin, water. For practical reasons, high density polyethylene is preferable. Said moderator 5 can be shaped in any shape, provided that said shape is such that the various sensors are separated from the external environment by a sufficient quantity of moderator. For the purpose of a correct measurement also according to the angle of incidence, it is useful that this amount of moderator is the same in all directions in the half-space towards the outside of the human body. The hemispherical shape is therefore preferable, but a polyhedral cap can also be suitable for providing useful results. In the hypothesis, shown in FIG. 1, of a spherical cap in high density polyethylene, the radius may vary from about 1 cm to about 10 cm. Higher values can also be chosen, but the dosimeter will be less practical and more difficult to wear.

Acquired Signal Processing Unit

The unit is not shown in FIG. 1. The sensors for slow neutrons will be connected to a processing unit of the signals acquired by them. Said processing unit, which can be easily designed by an expert in the field, may include elements contemplated by the prior art, such as electronic filters, charge preamplifiers, signal amplifiers, memories, microprocessors, micro-programmed units. Said microprocessors and micro-programmed units will include software elements. The processing unit may include acoustic or visual elements, such as LED lamps, displays, sound elements. These can also perform the function of highlighting the exceeding of certain preset thresholds. For example, a LED can remain off until the radiation rate H does not exceed a first pre-settable threshold, and light up with certain colors and/or timings if this value exceeds increasing thresholds. The information that the dosimeter will be able to calculate, store and/or report may be: the accumulated H value, the accumulation time, the time series of the H rate values starting from a certain initial instant, the uncertainty about these quantities.

The processing unit can be programmed on the dosimeter itself, using one or more function keys, or remotely. In the latter case, the dosimeter will communicate with a computer or a remote control unit through prior art protocols, for example: wired, wireless, radio, Bluetooth.

The dosimeter can operate with rechargeable batteries or single use. The expert in the field will be able to easily design the dosimeter feeding system and the most convenient ways to refill or replace it.

Support Element

The dosimeter will be worn on the body, preferably on the trunk, positioned on a garment or portion of it like a collar, a breast pocket or a belt, through fasteners available in the known art, such as clips, buttons or velcro elements.

Description of the Measurement Method

The dosimeter of the invention allows to determine the neutron dose H received by a subject exposed to neutron radiation with energies that vary from the slow domain (less than 0.5 eV) to 20 MeV. In particular, the dosimeter allows to measure $H_p(10)$, equivalent of personal dose at 10 mm of depth under a specific point of the human body as defined by the international commissions ICRP and ICRU.

The method that allows this determination includes the following basic stages.

The operating principle is based on the observation that an appropriate mathematical combination of the signals generated by a multiplicity of slow neutron sensors (two at least), placed inside an additional moderator with respect to the human body, in different positions with respect to the the human body, with the possible introduction of layers of slow neutron absorber material, can provide an indication of the energy of the neutron field that is affecting the human body and the dosimeter.

In order to use the described dosimeter and method usefully, two distinct phases must be carried out:

(1) A calibration phase, to be carried out before using the dosimeter in practice. The calibration will be carried out at a center equipped with reference neutron sources. An example of these sources are the mono-energy beams described by the ISO 8529 series standards. The calibration phase allows to determine the energy recognition curve. FIG. 2 illustrates an example of this curve for a case of two sensors S1 and S2 as illustrated in FIG. 1.

The energy recognition curve is constructed through the following main operating phases:

(1.a) The dosimeter, applied to a puppet simulating the human body (defined by ISO: 30 cm×30 cm×15 cm, with plexiglass walls and filled with water), will be exposed to reference neutron fields, with different energies, with known values of H. For each exposure the sensor signals will be acquired. If the sensors S1 and S2 supply a number of electrical impulses proportional to the number of slow neutrons they have received, the S2/S1 ratio will be calculated, between the number of impulses supplied by S2 and those supplied by S1.

The various S2/S1 ratios measured as a function of the various energies of the neutron beams used will make it possible to construct the energy recognition curve.

The curve of FIG. 2 was determined by exposing a prototype in monoenergetic neutron fields of various energies (0.144 MeV, 0.565 MeV, 1.2 MeV, 2.9 MeV).

It will also be necessary to check if and how this curve varies with the angle of incidence of the radiation on the puppet. The expert in the field is able to carry out this check.

(1.b) the calibration coefficients of the various slow neutron sensors vary with the variation of the incident energy. In the case of FIG. 1, a calibration coefficient $K_1$ will be calculated (for sensor S1) and a calibration coefficient $K_2$ (for sensor S2) defined as the ratio between the known value of H, with varying energy, and the corresponding sensor signal (for example: number of electrical impulses). In practice, the calculation of the calibration coefficient K will be determined as the ratio between the neutron dose H administered/supplied referred to in point 1a) and the corresponding sensor signal (Sn).

The calibration coefficients of the different sensors will therefore be a function of the incident neutron energy, i.e. for each incident energy value there will be a different numerical value of the calibration coefficient for a given sensor. In the example of FIG. 1 and FIG. 2, these functions will be $K_1(E)$ and $K_2(E)$. The method for determining these calibration coefficients is described in the ISO 8529 series standards.

(2) An operating phase, which will constitute the normal functioning of the dosimeter when worn on the human body, preferably on the trunk. In this phase the following main operations will be performed:

(2.a) Acquire, for a predetermined time interval, the signal of the various slow neutron sensors, by means of the processing unit to which the sensors are connected. Depending on the type of slow neutron sensor and its efficiency, different acquisition times will be required to have the same measurement precision. If the sensor supplies a number of electrical impulses proportional to the number of slow neutrons that have reacted in the sensitive material, the precision of the measurement will be proportional to the inverse of the square root of the number of registered impulses [1]. The higher the intensity of the neutron field, the less time it will take to reach a given measurement accuracy. A typical value is one minute of measurement for an accuracy of 10% when the rate of $H_p(10)$ is 10 microSieverts per hour (assuming it is the field produced by the source of 252-Cf (according to ISO 8529-1) The predetermined time interval for making the measurements is therefore a time that the skilled in the art can easily determine.

(2.b) Based on the information provided by the various sensors, calculate the mathematical function which, as shown in the calibration phase, is useful for estimating the equivalent energy of the incident neutron field. In the example shown here with the device shown in FIG. 1, if the sensors suppling a number of electrical pulses proportional to the number of slow neutrons they have received, the S2/S1 ratio will be calculated, between the number of pulses supplied from S2 and those provided by S1.

(2.c) Compare the S2/S1 ratio with the energy recognition curve determined in the calibration phase. This will allow to estimate the equivalent energy of the incident neutron field, called $E_{eq}$. For example, S2/S1=0.60 corresponds to an equivalent energy $E_{eq}$ of about 1.2 MeV. In practice, the equivalent energy of the incident neutron field, called $E_{eq}$ is obtained from the energy recognition curve constructed at point (1a).

(2.d) Knowing $E_q$ will determine the correct numerical value of the calibration coefficient for the different sensors. In the example of FIG. 1 and FIG. 2, the values $K_1(E_{eq})$ and $K_2(E_{eq})$ will also be determined by interpolation. In practice, obtained the value of the equivalent energy $E_{eq}$ as from the previous point (2c), the K ($E_{eq}$) values are identified through each curve constructed in (1b).

(2.e) Multiply the signal of the different sensors by the correct numerical value of the calibration coefficient, obtaining, for each sensor, an estimate of H. In the example of FIG. 1 and FIG. 2, the equivalent doses of neutron radiation $H_p(10)$ estimated by each sensor (S) as follows:

$$H_p(10) \text{ (sensor } S1) = S1 \times K_1(E_{eq})$$

$$H_p(10) \text{ (sensor } S2) = S2 \times K_2(E_{eq})$$

The best estimate of the value of H, which the dosimeter will record as a result of the measurement, will be calculated as the average of the values provided by the different sensors (S1 and S2 in the case exemplified in the figures). This average can be recorded in a memory as the acquisition time changes (for example, a value every hour) or added over time to provide a neutron dose value integrated over time. By recording the arrival of the pulses as a function of time, it will then be possible to process a historical series of the rate of H starting from a pre-established initial time.

The dosimeter and the method of the invention allow to determine the neutron dose in the energy range of neutrons ranging from the domain of slow neutrons to 20 MeV.

Advantages of the Dosimeter of the Invention:
  wearable and suitable for personal dosimetry
  active, i.e. immediate direct reading
  based on the combination of the measurement of albedo neutrons (moderated by body 1) and direct neutrons moderate by moderator material 5.

The dosimeter described here, combining the moderation of the human body 1 with that of the moderator 5, achieves an acceptable compromise for personal dosimetry, wearable, light and with the best response of different commercial devices.

The device of the invention can be advantageously used as a "personal neutron dosimeter" for workers exposed to ionizing radiation. The sectors of application are the industrial one (non-destructive inspections with neutron sources, neutronigraphy, humidity measurements in civil engineering, oil inspections), energy (nuclear and fuel plants), research (particle accelerators), medical (accelerators for both conventional and hadronic radiotherapy).

BIBLIOGRAPHY

[1] Radiation detection and measurement. Edition, 4th ed. Author (s), Knoll, Glenn F. Publication, New York, NY: Wiley, 2010.-830 p

The invention claimed is:

1. A method for determining the dose of neutron radiation H received by a subject exposed to neutron radiation with a wearable dosimeter, said method comprising:
  (1) a calibrating step, to be carried out before using the wearable dosimeter, carried out at different energies with a reference neutron radiation source to determine the energy recognition curve, said curve being constructed using a method comprising the operating phases:
    (1.a) exposing the wearable dosimeter, applied on a puppet, to said reference neutron source to supply the dosimeter with predetermined doses of energy H, acquiring the signals of the at least one first neutron sensor (2), or S1, and the at least one second neutron sensor (4), or S2, then calculate the S2/S1 ratio of the signals measured according to the different energies to construct the energy recognition curve;
    (1.b) calculating the at least one first $K_1$ and the at least one second $K_2$ calibration coefficients for the at least one first neutron sensor (2) and at least one second neutron sensor (4) (S1, S2), said coefficients being defined as the ratio between the neutronics dose value H administered, and the signal of the corresponding sensor;
  (2) operating the wearable dosimeter by a method, comprising the following operations when the dosimeter is worn on or is in proximity to the human body (1):
    (2.a) In a predetermined time interval acquiring the signal of the at least one first neutron sensor (2) and at least one second neutron sensor (4) (S1, S2) through a processing unit, wherein the processing unit is configured to process signals acquired by the at least one first neutron sensor (2) and the at least one second neutron sensor (4) of the wearable dosimeter, wherein said processing unit comprises at least one of: an electronic filter, a charge preamplifier, a signal amplifier, a memory, a microprocessor, a micro-programmed unit, and/or a software element;

(2.b) calculating the S2/S1 ratio, between the number of pulses supplied by the at least one first neutron sensor (2) and at least one second neutron sensor (4) (S1, S2);

(2.c) comparing the S2/S1 ratio with the energy recognition curve constructed in the calibration phase at point to derive the equivalent energy $E_{eq}$ of the incident neutron field;

(2.d) determining the correct numerical value of the calibration coefficient through each curve constructed in the calibration phase at point (1 b) for the different sensors;

(2.e) multiplying the signal of the at least one first neutron sensor (2) and at least one second neutron sensor (4) (S1, S2) by the correct numerical value of the corresponding calibration coefficient, obtaining, for each sensor, an estimate of the value of H; and (2.f) calculating the neutron dose in the predetermined time interval as the average of the values provided by the different sensors, wherein the wearable dosimeter is adapted for being worn on or in proximity to a human body (1) for detecting a neutron dose received by a subject exposed to neutron radiation, and the wearable dosimeter comprises:

at least one first neutron sensor (2) for detecting the neutron dose;

a matrix (3) comprising a neutron absorber material (3);

at least one second neutron sensor (4) for detecting the neutron dose;

wherein the matrix (3) is interposed between the at least one first neutron sensor (2) and the at least one second neutron sensor (4);

a moderator (5) comprising a hydrogenated or deuterated material selected from the group consisting of polyethylene, polypropylene, paraffin, hydrogenated plastics, water and a combination thereof;

wherein the at least one first neutron sensor (2) and the at least one second neutron sensor (4) are configured as a complex comprising a material sensitive to the passage of neutron's, a device capable of producing an electrical signal related with energy released by a slow neutron capture reaction by the material sensitive to the capture of neutrons, said complex capable of generating a recordable signal; and wherein the at least one first neutron sensor (2) and the at least one second neutron sensor (4) are each an electric type neutron sensor configured inside the moderator (5) and spaced apart from each other, and the at least one first electric type neutron sensor (2) is configured to be near the human body (1) when the wearable dosimeter is worn by the subject, wherein the moderator (5) is shaped in a form such that between the at least one second neutron sensor (4) and an external environment there is about the same amount of moderator (5) in all the directions in a half-space towards the outside of the human body (1), wherein the moderator (5) moderates neutrons arriving at the at least one first electric type neutron sensor (2) and the at least one second electric type neutron sensor (4), and the at least one first electric type neutron sensor (2) and the at least one second electric type neutron sensor (4) being sensitive to all energy components of the neutron dose, wherein the matrix (3) is placed as a layer in between said at least first and second sensor (S1, S2) and shields said at least first sensor (S1), so that said at least second sensor (S2) detects those neutrons that are moderated by said moderator (5) and said at least first sensor (S1) only detects albedo neutrons, that is those neutrons attenuated and retro-diffused by said human body (1), in order to differentiate the quantities of moderated neutrons that reach said at least first and second sensor (S1 S2), so as said wearable dosimeter (A) is able to measure the neutron dose received by said human body (1) in a range from less than 0.5 eV to 20 MeV.

2. The method of claim 1, wherein the measured neutron dose is about $H_p(10)$, being $H_p(10)$ the equivalent of personal dose at a depth of 10 mm below a specific point on the human body (1).

3. The method of claim 1, further comprising an electronic processing unit included in or operably associated with the dosimeter.

4. The method of claim 3, wherein the electronic processing unit comprises a computer or is operably connected to a computer.

5. The method of claim 1, wherein in the wearable dosimeter the material sensitive to the passage of neutrons comprises one or more elements selected from: 10-Boro, 6-Lithium, 3-Helium, Gadolinium, Cadmium, an isotope having a high cross section for neutron nuclear capture and a combination thereof.

6. The method of claim 1, wherein in the wearable dosimeter the device associated with the at least one first neutron sensor (2) and the at least one second neutron sensor (4) comprises a semiconductor electric device.

7. The method of claim 1, wherein in the wearable dosimeter the at least one first neutron sensor (2) and/or the at least one second neutron sensor (4) comprises:

(a) a crystal, glass or a scintillating fiber comprising 6-Lithium, 10-Boron, 3-Helium, Gadolinium, Cadmium or an isotope which has a high cross section for the neutron nuclear capture as defined in the ICRU85a report, wherein the crystal, glass or scintillating fiber signal conversion element is configured as a dynode, solid state photomultiplier or other electrical device capable of transforming the light emitted by said crystal, glass or scintillating fiber into an electrical signal;

(b) a diode, a transistor, a photo-diode, a semiconductor photo-transistor covered by 6-Lithium, 3-Helium, 10-Boron, Gadolinium, Cadmium or an isotope which has a high cross section for the neutron nuclear capture as defined in the report ICRU85a; and/or (c) a gas meter, an ionization chamber, a proportional or a discharge meter comprising containing 6 Lithium, 10-Boron, 3-Helium, Gadolinium, Cadmium or an isotope that has a high cross section for the neutron nuclear capture as defined in the ICRU85a report.

8. The method of claim 1, wherein the matrix (3) comprises a layer of absorber material for neutrons, wherein the matrix (3) comprises a material comprising 6 Lithium, 10-Boron, 3-Helium, Gadolinium, Cadmium or an isotope which has a high cross section for nuclear neutron capture as defined in the ICRU85a report.

9. The method of claim 1, wherein the moderator (5) is shaped as a hemispherical shape or a polyhedral shell.

10. The method of claim 9, wherein the moderator (5) is shaped as a hemispherical shape or a polyhedral shell of radius or thickness ranging from about 1 cm to about 10 cm.

11. The method of claim 1, further comprising an attaching or a fixing element for adapting or attaching the wearable dosimeter to the human body (1).

12. The method of claim 6, wherein the semiconductor electric device is selected from group consisting of: a diode, a transistor, a photodiode, a phototransistor and a capacitive device.

13. The method of claim 12, wherein the capacitive device comprises a capacitor.

14. The method of claim 11, wherein the fixing element comprises clips, buttons or velcro positioned on a garment or a portion thereof.

15. The method of claim 1, wherein step (2) comprises operating the wearable dosimeter by a method comprising wearing the dosimeter worn on the trunk.

16. The method of claim 14, wherein clips, buttons or Velcro are positioned on a lapel, a breast pocket or a belt.

* * * * *